United States Patent
Palit et al.

(10) Patent No.: US 11,121,662 B2
(45) Date of Patent: Sep. 14, 2021

(54) CLOSED LOOP RESONANCE TRACKING USING PHASE MATCHING

(71) Applicant: TEXAS INSTRUMENTS INCORPORATED, Dallas, TX (US)

(72) Inventors: Supriyo Palit, Kolkata (IN); David Hernandez, Fort Worth, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/856,490

(22) Filed: Apr. 23, 2020

(65) Prior Publication Data

US 2020/0389113 A1    Dec. 10, 2020

Related U.S. Application Data

(60) Provisional application No. 62/857,487, filed on Jun. 5, 2019.

(51) Int. Cl.
*H02P 25/06* (2016.01)

(52) U.S. Cl.
CPC .................... *H02P 25/06* (2013.01)

(58) Field of Classification Search
CPC ....... H02P 23/0004; H02P 23/14; H02P 25/06
See application file for complete search history.

(56) References Cited

U.S. PATENT DOCUMENTS

| | | | |
|---|---|---|---|
| 6,437,524 B1 * | 8/2002 | Dimanstein | H02P 25/032 318/119 |
| 6,538,402 B2 * | 3/2003 | Gokturk | H02P 25/032 318/126 |
| 6,777,895 B2 | 8/2004 | Shimoda et al. | |
| 7,843,277 B2 | 11/2010 | Gregorio et al. | |
| 9,054,627 B2 * | 6/2015 | Garg | H02P 25/032 |
| 9,344,022 B2 * | 5/2016 | Khan | H02P 29/032 |
| 10,958,203 B2 * | 3/2021 | Meng | H02P 25/06 |
| 2003/0102828 A1 | 6/2003 | Kusakabe | |
| 2010/0153845 A1 | 6/2010 | Gregorio et al. | |

* cited by examiner

*Primary Examiner* — Thai T Dinh
(74) *Attorney, Agent, or Firm* — John R. Pessetto; Charles A. Brill; Frank D. Cimino

(57) ABSTRACT

Disclosed embodiments include a method for closed loop phase tracking comprised of determining a first estimated resonant frequency, generating a motor drive signal at the first estimated resonant frequency and applying the motor drive signal to a motor, measuring current and voltage of the motor drive signal, and filtering the measurements of current and voltage of the motor drive signal. The phase difference between the filtered current and voltage waveforms is measured and a second estimated resonant frequency is calculated. The generated motor drive frequency is adjusted to equal the second estimated resonant frequency.

22 Claims, 4 Drawing Sheets

CLOSED LOOP RESONANCE TRACKING USING PHASE MATCHING

RELATED APPLICATION

This patent arises from an application claiming the benefit of U.S. Provisional Patent Application Ser. No. 62/857,487, which was filed on Jun. 5, 2019. U.S. Provisional Patent Application Ser. No. 62/857,487 is hereby incorporated herein by reference in its entirety. Priority to U.S. Provisional Patent Application Ser. No. 62/857,487 is hereby claimed.

BACKGROUND

A linear resonant actuator (LRA) is a vibration motor that produces an oscillating force along a single axis. An LRA uses an AC voltage to drive a voice coil that produces an electromagnetic field. The electromagnetic field moves a magnetic mass that is connected to a spring, resulting in a haptic vibration. Numerous cell phone manufacturers use LRAs to produce a wide range of vibrotactile effects. Therefore, it is desirable that the power consumption of the LRA is relatively low. Other types of consumer electronics, e.g. tablets, laptops, and video game controllers, also use LRAs to provide haptic vibration feedback.

When the voice coil of the LRA is driven at the resonant frequency of the LRA, the LRA can vibrate with its maximum force. When an LRA is driven at its resonant frequency, power efficiency is improved and the force of its vibration is increased.

The resonant frequency of the spring can vary and even change over time due to a variety of factors including temperature, aging, and humidity. For instance, a spring can become less stiff over time due to use and wear. Because optimal efficiency of an LRA typically occurs in a narrow frequency band centered at the resonant frequency, significant reduction in vibration strength of the LRA can result if the resonant frequency of the spring changes without the drive circuit frequency changing with it.

While the examples given relate to linear resonant actuators, such as for haptic feedback devices, this disclosure applies more generally to resonant frequency tracking and control for resonator devices.

SUMMARY

Example embodiments include a method for closed loop phase tracking comprised of determining a first estimated resonant frequency, generating a motor drive signal at the first estimated resonant frequency and applying the motor drive signal to a motor, measuring current and voltage of the motor drive signal, and filtering the measurements of current and voltage of the motor drive signal. The phase difference between the filtered current and voltage waveforms is measured and a second estimated resonant frequency is calculated. The generated motor drive frequency is adjusted to equal the second estimated resonant frequency.

A second example embodiment includes an apparatus for closed loop control of a linear resonant actuator comprising a motor drive circuit that generates a motor drive signal having a frequency of a first resonant frequency and configured to provide the motor drive signal to a motor, a current and voltage sensing circuit configured to measure current and voltage from the motor drive signal and a noise filter circuit coupled to the current and voltage sensing circuit that filters noise from the current and voltage measurements. A phase measurement circuit is coupled to the noise filter circuit configured to receive the filtered current and voltage measurements as inputs and to output phase measurements of the current and voltage and a difference in phase between the current and voltage measurements, and a resonant frequency tracking circuit is coupled to the phase measurement circuit configured to receive the phase measurements of the current and voltage and the difference in phase as inputs, calculate a second resonant frequency, and output to the motor drive circuit a frequency command corresponding to the second resonant frequency.

A third example embodiment includes a system for closed loop control of a linear resonant actuator comprising a motor drive circuit configured to generate a motor drive signal having a frequency of a first resonant frequency, a current and voltage sensing circuit configured to measure current and voltage from the motor drive signal, and a noise filter circuit configured to receive the current and voltage measurements and to filter noise from the current and voltage measurements. A phase measurement circuit is configured to receive the filtered current and voltage measurements and to output phase measurements of the current and voltage and a difference in phase between the current and voltage measurements, and a resonant frequency tracking circuit is configured to receive the phase measurements of the current and voltage and the difference in phase, calculate a second resonant frequency, and output to the motor drive circuit a frequency command corresponding to the second resonant frequency.

Like reference symbols in the various drawings indicate like elements. Details of one or more implementations of the present disclosure are set forth in the accompanying drawings and the description below. The figures are not drawn to scale and they are provided merely to illustrate the disclosure. Specific details, relationships, and methods are set forth to provide an understanding of the disclosure. Other features and advantages may be apparent from the description and drawings, and from the claims.

DETAILED DESCRIPTION

Figure 1:
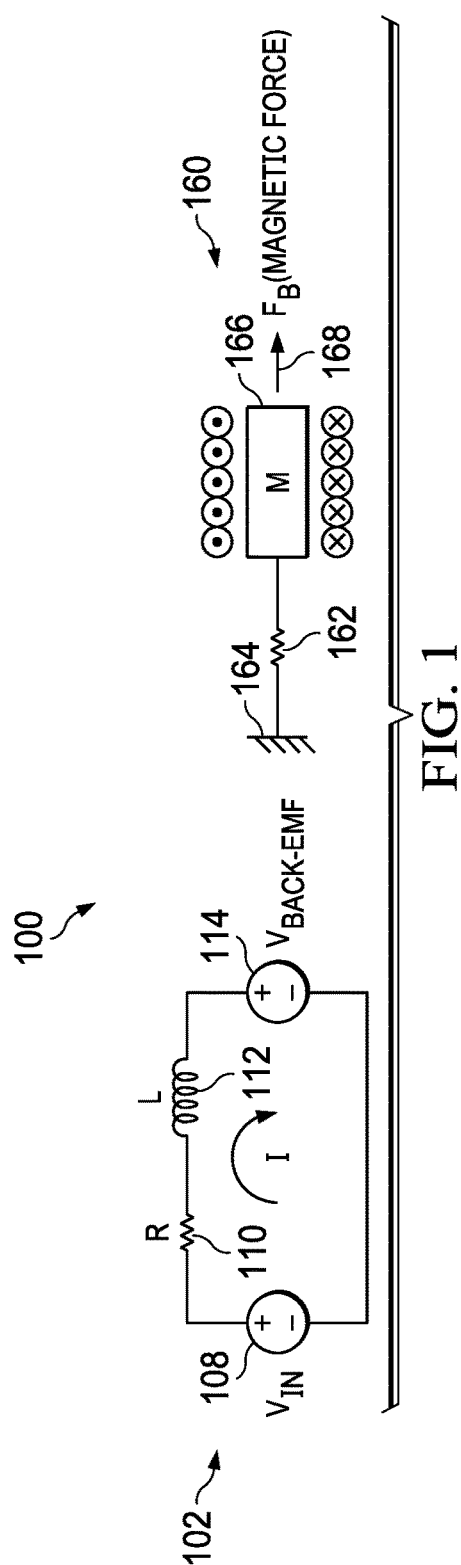
FIG. 1 shows an example model of an LRA.

FIG. 1 shows an example model 100 of an LRA. The electrical portion 102 of LRA model 100 comprises a motor driver circuit 108, a motor coil DC resistance 110, a motor coil inductance 112, and a back electromotive force (emf) voltage 114. A motor drive signal is generated by the motor driver circuit 108 and can be applied to the LRA motor, which is modeled electrically as a DC resistance 110 in series with a motor coil inductance 112. The application of a motor drive signal 108 to the motor results in motion and the motor generating a back emf voltage 114. The back emf voltage 114 opposes the motor drive signal 108 and provides feedback indicative of system characteristics.

The mechanical portion 160 of LRA model 100 comprises a spring 162 attached to a mechanical ground 164 on one end, and to a magnetic mass 166 on the other end. There is an electromagnetic force 168 that results from the motor drive signal 108 driving the LRA motor.

Electrical current passes through the motor coil 112 and creates a magnetic field. The magnetic field interacts with the magnetic flux of the magnetic mass 166 and injects a force into the mechanical system which will move the magnetic mass 166. The amount of force applied to the magnetic mass 166 will be proportional to the current that passes through the motor coil. The magnetic mass 166 is attached to a mechanical ground 164 with a spring 162. If a force is applied in the direction to the right, the magnetic mass 166 will move to the right as long as the force continues to be applied, or until the resistance of the spring 162 equals that force, at which time the magnetic mass 166 will stop moving.

Once the current through the coil is stopped, the spring 162 will contract, exerting a force to move the magnetic mass 166 in the opposite direction. The spring 162 will contract to the point that it begins to push the magnetic mass 166 away, causing the magnetic mass 166 to move again in the first direction. The system will continue to resonate in this manner at a resonant frequency. The resonant frequency may be influenced by multiple factors including how stiff the spring is and how heavy the magnetic mass is. In some examples, the resonant frequency may be in the range between 150 Hz and 250 Hz.

It is desirable to synchronize the resonant frequency of the spring 162 with the frequency of the motor drive signal 108 because the highest acceleration of the magnetic mass can be created when the LRA motor coil is driven at the resonant frequency and in phase with the spring. The acceleration of the magnetic mass can be optimal when the magnetic field created by the drive current is in the same direction the magnetic mass is moving, and when the motor drive current changes direction at the same time the spring reaches the end of its excursion. Therefore, it is desirable that the motor drive current and the motion of the magnetic mass are synchronized in both phase and frequency to improve LRA efficiency and optimize the vibration strength of the LRA.

The mechanical resonant frequency of the LRA can change due to such factors as temperature, aging in the spring and other components, mechanical mounting, and whether the device is being gripped tightly or lying on a table. As the spring ages and its time of use increases, the spring can get softer, causing the spring constant to decrease. As the spring gets softer, the resonant frequency decreases. Therefore, it is beneficial to continuously track the resonant frequency of the LRA so that changes in the resonant frequency can be sensed and the electrical motor drive can be adjusted accordingly.

The motor drive signal 108 is preferably bipolar so that the magnetic mass 166 can be driven in both directions. The shape of the motor drive signal 108 can be any bipolar shape such as sinusoidal, triangular, or square wave.

Figure 2:
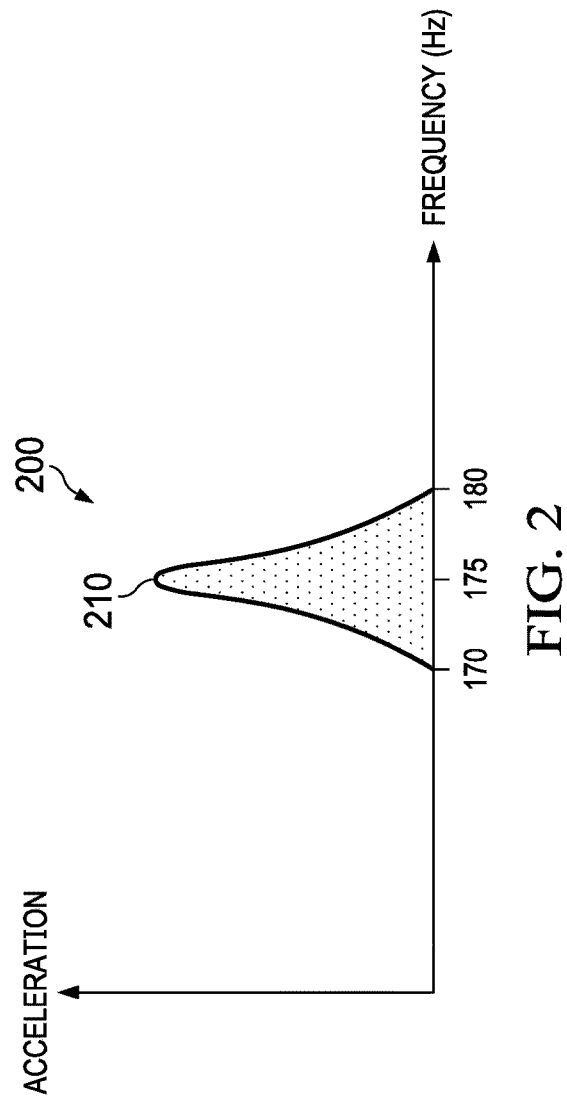
FIG. 2 shows an example graph of the acceleration of a magnetic mass as a function of the motor drive signal frequency for an LRA system.

FIG. 2 shows an example graph 200 of the strength of acceleration of a magnetic mass as a function of the motor drive signal frequency for an LRA system having a resonant frequency 210 of 175 Hz. The LRA responds as a bandpass filter having a relatively high Q-factor, meaning it has a relatively small bandwidth. The highest acceleration occurs when the LRA is driven at the resonant frequency 210. The acceleration of the magnetic mass drops significantly as the motor drive frequency deviates from the resonant frequency to either a higher frequency or a lower frequency. The higher the Q-factor of the LRA, the more advantageous it is to track the resonant frequency and adjust the drive frequency to match the resonant frequency.

One possible approach to finding the resonant frequency is to drive the LRA for a set time, then toggle the drive circuit into a high impedance state and sense the back emf voltage. The resonant frequency can be found by measuring the time between consecutive peaks or consecutive zero-crossings of the back emf voltage signal. The frequency of the motor drive signal 108 can then be adjusted to match the resonant frequency. The circuit can then be toggled back from a high impedance state into drive mode, and the motor coil is once again driven. The process continues toggling between drive mode and sense mode with iterative adjustments in the drive frequency in between. However, this approach comes with a drawback. Switching between drive mode and sense mode can result in reduced power efficiency and decreased acceleration of the magnetic mass, as well as generating mechanical noise.

One possible drawback to this approach is that the drive circuit must be placed into a high impedance state while monitoring the back emf signal to avoid interference of the back emf measurement with the drive circuit signal. The motor coil cannot be driven while the circuit is in high impedance state, so efficiency is lost by switching back and forth between a motor drive state and a back emf voltage measurement state.

Figure 3:
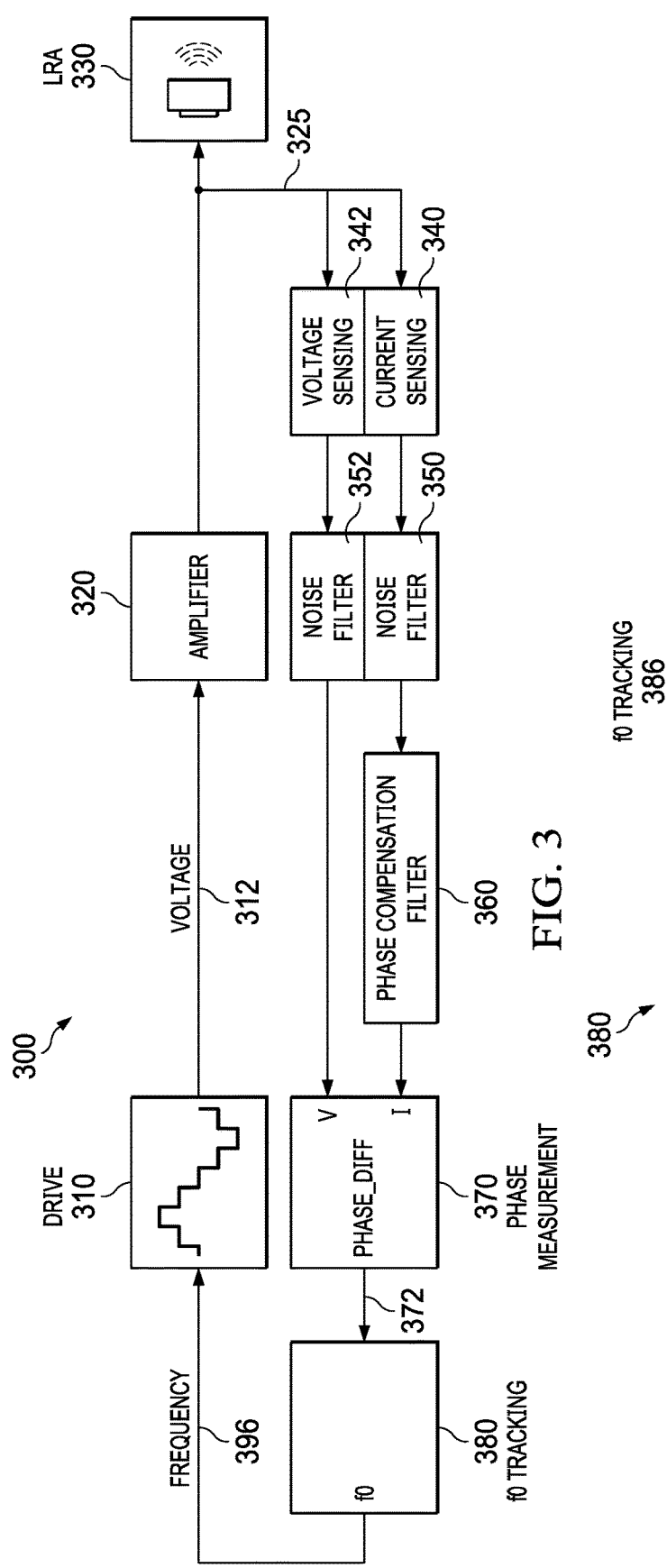
FIG. 3 shows a block diagram of an example embodiment for closed loop control of an LRA system by measuring the voltage and current to determine the resonant frequency.

FIG. 3 shows a block diagram of an example embodiment that determines the resonant frequency without measuring the back emf signal, and thus does not require interfering with the drive circuit by switching back and forth between a motor drive state and a back emf voltage measurement state. Instead, the phase difference between the motor drive current and voltage waveforms can be used to find the resonant frequency. When the phase difference between the current and voltage waveforms is essentially zero, the system is operating at the resonant frequency.

Motor drive circuit 310 is a voltage drive circuit with the means to adjust the frequency and amplitude of its output 312. The output 312 of the motor drive circuit 310 is coupled to the input of an amplifier 320 which in some examples may provide current or voltage amplification. The output 325 of the amplifier 320 is coupled to an LRA 330 driving the motor in the LRA 330. The output 325 of amplifier 320 is also coupled to a current sensing circuit 340 and a voltage sensing circuit 342. The current sensing circuit 340 and the voltage sensing circuit sense and measure the current and voltage, respectively, being delivered to the LRA motor. In at least one example embodiment, the current sensing circuit 340 and voltage sensing circuit 350 include analog-to-digital converters to digitize the sensed current and voltage waveforms. However, in other embodiments, the sensed current and voltage waveforms at the output of the current sensing circuit 340 and voltage sensing circuit 350 may remain in analog format.

The output of the current sensing circuit 340 is coupled to the input of a noise filter 350 that reduces electrical noise from the sensed current waveform. The noise filter 350 may be a low pass filter in some example implementations. However, the noise filter 350 can be a bandpass filter in other example implementations, and the passband of the bandpass filter may be centered near the expected resonant frequency.

The output of the voltage sensing circuit 342 is coupled to the input of a noise filter 352 that reduces electrical noise from the sensed current waveform. The noise filter 352 may be a low pass filter in some example implementations. However, the noise filter 352 can be a bandpass filter in other example implementations, and the passband of the bandpass filter may be centered near the expected resonant frequency.

In an alternative example embodiment, only the current waveform is sensed from the amplifier output 325, and a voltage waveform is derived from the output 312 of the motor drive circuit 310 and fed directly to noise filter 352. In such a case, the noise filter for the voltage waveform can be additionally used to adjust the time delay between the output 312 of the motor drive circuit and the output 325 of the amplifier driving the LRA. Other similar example embodiments can also be considered where the motor drive is a current drive and only the voltage signal is sensed from the output of amplifier 320 and a current waveform is derived from the output of the motor drive circuit. In the case of a current drive signal where only the voltage is sensed, the noise filter for the current waveform can be used to adjust the time delay between the output of the motor drive circuit 310 and the output of amplifier 320.

The output of the noise filter 350 is coupled to a phase compensation filter 360. The phase compensation filter 360 reduces the phase distortion of the sensed current signal, which can result in a more accurate determination of the resonant frequency. The reduced phase distortion from the output of the phase compensation filter 360 can also improve the closed loop performance of the system 300. In the example embodiment of FIG. 3, only the sensed current signal is applied to the phase compensation filter 360 because the motor drive 310 is a voltage drive, so the effects of the motor coil inductance add a phase delay only to the sensed current signal. In other example embodiments where the motor drive 310 is current driven, the sensed voltage signal can be applied to the phase compensation filter 360 rather than the sensed current signal.

The output of the phase compensation filter 360 and noise filter 352 are coupled to a phase measurement circuit 370 which determines the phase difference between the sensed current signal and the sensed voltage signal. In one example embodiment, the time between a zero-crossing of the sensed current signal and the zero-crossing of the sensed voltage signal can be used to determine the phase difference between the sensed current signal and the sensed voltage signal.

Since a zero crossing can either be a rising zero crossing or a falling zero crossing, the time between the same types of zero crossing should be used to determine the phase difference. Alternatively, the time between a peak of the sensed current signal and the peak of the sensed voltage signal can be used to determine the phase difference. When the phase difference between the sensed current signal and the sensed voltage signal is substantially equal to zero, the system 300 is operating in resonance and the optimal frequency for the motor drive has been found.

The output 372 of the phase measurement circuit 370 is coupled to the resonant frequency tracking circuit 380. The resonant frequency tracking circuit 380 determines, based on the phase relationship between the sensed current signal and the sensed voltage signal, what adjustment to make to the frequency command signal 396 sent to the motor drive circuit 310 to adjust the frequency of its output 312. The motor will now be driven at the newly commanded frequency. Iterative adjustments to the frequency of the output 312 of motor drive circuit 310 are made using the frequency command signal 396 until the resonant frequency of the system 300 is obtained.

Figure 4:
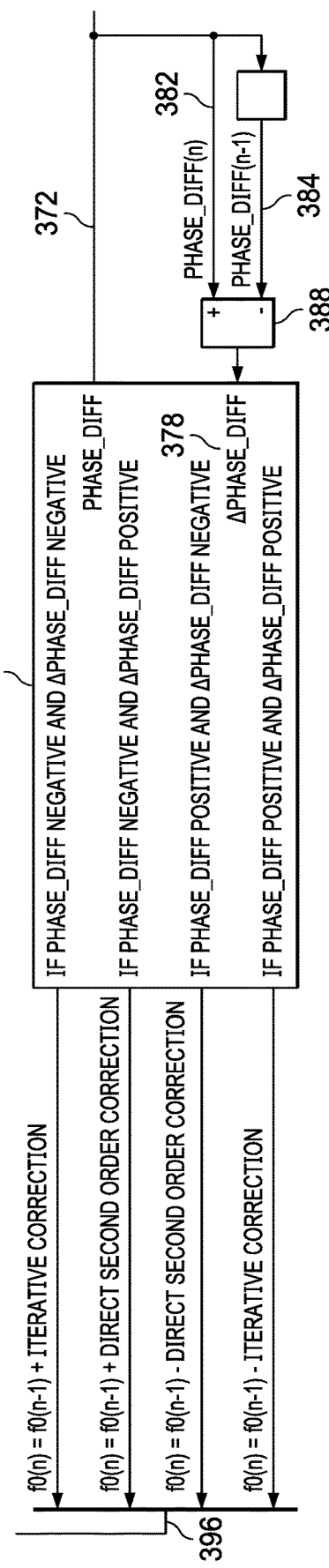
FIG. 4 shows a block diagram of an example resonant frequency tracking circuit.

FIG. 4 shows a more detailed block diagram of an example resonant frequency tracking circuit 380. The phase difference 372, which is the output of the phase measurement circuit 370, is coupled to registers holding Phase Difference (n) 382 and Phase Difference (n−1) 384. Phase Difference (n) 382 is the most recent sample of the output 372 and Phase Difference (n−1) 384 is the previous sample of the output 372. The data for Phase Difference (n) 382 in a given cycle will become Phase Difference (n−1) 384 in the next cycle. In some example embodiments, a sample-and-hold circuit may be used to capture the data of Phase Difference (n) so that the value may be used as Phase Difference (n−1) in the following cycle.

The sample from the previous cycle Phase Difference (n−1) 384 is subtracted from Phase Difference (n) 382 to determine the change in phase difference 378 resulting from the change in drive frequency. The change in phase difference 378 together with the phase difference 372 determine what equation the resonant frequency tracking circuit 386 uses to calculate the next estimate $f_{0\_est}$ of the resonant frequency, which will become the next frequency command signal 396 sent to the motor drive circuit 310.

Figure 5:
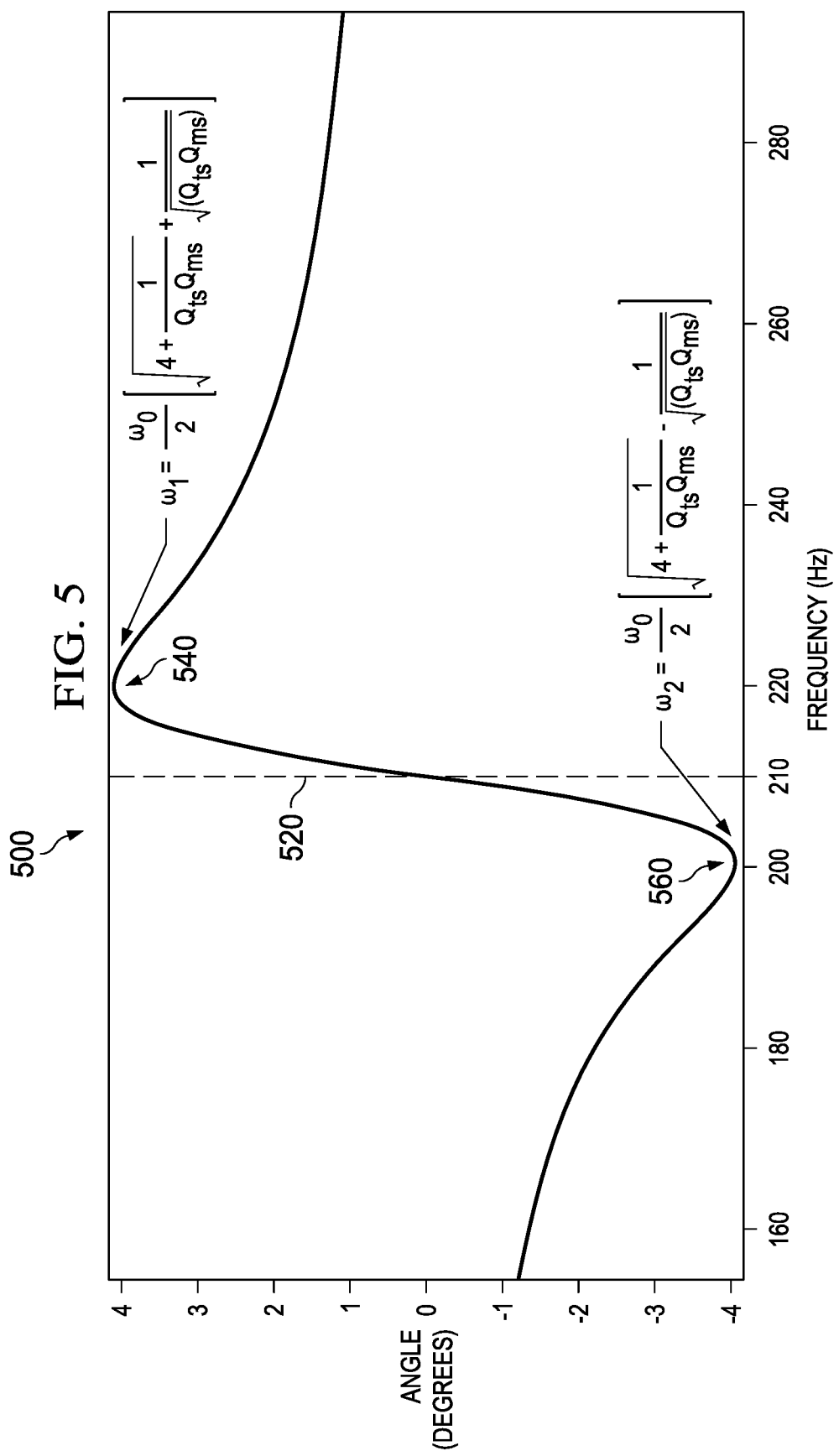
FIG. 5 shows an example plot of phase difference between current and voltage as a function of frequency in a resonant frequency tracking circuit.

FIG. 5 shows an example plot 500 of phase difference 372 as a function of frequency in a resonant frequency tracking circuit. In the example of FIG. 5, the resonant frequency 520 is 210 Hz. At the resonant frequency 520, the phase difference 372, which is the phase of the current waveform subtracted from the phase of the voltage waveform, is zero degrees. As the frequency increases from the resonant frequency 520, the phase difference 372 increases until it reaches an $\omega_1$ frequency 540 where the phase difference 372 peaks and begins to decrease as the frequency increases. Similarly, as the frequency decreases from the resonant frequency 520, the phase difference 372 decreases until it reaches an $\omega_2$ frequency 560 where the phase difference 372 peaks negatively and begins to increase as the frequency decreases.

The process can be improved by determining whether the phase difference measurement is in the frequency region lower than $\omega_2$ 560, between $\omega_1$ 540 and $\omega_2$ 560, or higher than $\omega_1$ 540 because the equation to calculate the next estimate of the resonant frequency will depend upon which of these regions the previous frequency was in. It is possible to determine the frequency region because, for example, if the phase difference is positive and the change in phase difference is positive when the frequency is decreased, the frequency must be higher than $\omega_1$ 540. Similarly, if the phase difference is positive and the change in phase difference is negative when the frequency is decreased, the frequency must be between $\omega_1$ 540 and the resonant frequency 520.

If the frequency region is between $\omega_1$ 540 and $\omega_2$ 560, then a second order approximation can be used to calculate the next estimated resonant frequency from the phase difference, resulting in a faster convergence to the resonant frequency. Otherwise, if the frequency is outside the region between $\omega_1$ 540 and $\omega_2$ 560, an iterative process may be used to bring the frequency into the region between $\omega_1$ 540 and $\omega_2$ 560.

The equations to find $\omega_1$ 540 and $\omega_2$ 560 are:

$$\omega_1 = \frac{\omega_0}{2}\left[\sqrt{4 + \frac{1}{Q_{ts}Q_{ms}}} + \frac{1}{\sqrt{Q_{ts}Q_{ms}}}\right]$$

$$\omega_2 = \frac{\omega_0}{2}\left[\sqrt{4 + \frac{1}{Q_{ts}Q_{ms}}} - \frac{1}{\sqrt{Q_{ts}Q_{ms}}}\right]$$

where $\omega_0$ is the resonant frequency in radians, Qts is the quality factor of the total system, and Qms is the quality factor of the mechanical system. The Q or quality factor is a dimensionless parameter that describes how underdamped an oscillator or resonator is. The quality factor of the total system can be defined as $Q=\omega_0/BW$, where BW is the bandwidth of the system response. The quality factor of the mechanical system is a function of the mass of magnetic mass 166 and the spring constant of spring 162. Between frequency regions $\omega_1$ 540 and $\omega_2$ 560, the resonant frequency $\omega_0$ can be found from the phase difference using the second order approximation equation:

$$\omega_0 = \begin{cases} \omega\left[1 - \dfrac{1}{\dfrac{Q_{ms}-Q_{ts}}{\tan\Phi} - \sqrt{\left(\dfrac{Q_{ms}-Q_{ts}}{\tan\Phi}\right)^2 - 4Q_{ts}Q_{ms}}}\right], & -\Phi_1 \le \Phi < 0 \\ \omega\left[1 - \dfrac{1}{\dfrac{Q_{ms}-Q_{ts}}{\tan\Phi} + \sqrt{\left(\dfrac{Q_{ms}-Q_{ts}}{\tan\Phi}\right)^2 - 4Q_{ts}Q_{ms}}}\right], & 0 < \Phi < \Phi_1 \end{cases}$$

where $\Phi$ is the phase difference 372, and $$\tan\Phi_1 = \frac{Q_{ms}-Q_{ts}}{2\sqrt{Q_{ts}Q_{ms}}}$$

If the phase difference is negative, the estimated resonant frequency is increased according to the equation $f_{0\_est}(n) = f_{0\_est}(n-1) + \Delta$, where $f_{0\_est}(n)$ is the estimated resonant frequency, $f_{0\_est}(n-1)$ is the previous estimated resonant frequency, and $\Delta$ is the desired change in frequency calculated to achieve driving the circuit at the resonant frequency. If the change in phase difference is positive as a result of this change in frequency, then a second order approximation can be used to find $\Delta$. However, if the change in phase difference is negative as a result of this change in frequency, then an iterative process may yield more accurate results than the second order approximation.

In the case where the phase difference is negative and the change in phase difference is positive as a result of increasing the frequency, the value of A can be found using the equation:

$$\Delta = f_{0\_est}(n-1) \times \frac{1}{\sqrt{\left(\dfrac{Q_{ms}-Q_{ts}}{\tan\Phi}\right)^2 - 4Q_{ts}Q_{ms}} - \dfrac{Q_{ms}-Q_{ts}}{\tan\Phi}}$$

If the phase difference is positive, the estimated resonant frequency is decreased according to the equation $f_{0\_est}(n) = f_{0\_est}(n-1) - \Delta$. If the change in phase difference is negative as a result of this change in frequency, then a second order approximation can be used to find $\Delta$. However, if the change in phase difference is positive as a result of this change in frequency, then an iterative process may yield more accurate results than the second order approximation.

In the case where the phase difference is positive and the change in phase difference is negative as a result of decreasing the frequency, the value of A can be found using the equation:

$$\Delta = f_{0\_est}(n-1) \times \frac{1}{\sqrt{\left(\dfrac{Q_{ms}-Q_{ts}}{\tan\Phi}\right)^2 - 4Q_{ts}Q_{ms}} + \dfrac{Q_{ms}-Q_{ts}}{\tan\Phi}}$$

If the frequency region is not between $\omega_1$ 540 and $\omega_2$ 560, then an iterative process must be used to track the resonant frequency, which in some examples may include using a fixed value for $\Delta$. As a result of determining a new value of $\Delta$, a new $f_{0\_est}(n)$ is calculated. The new value of $f_{0\_est}(n)$ becomes the next frequency command signal 396 sent to the motor drive circuit 310 completing the closed loop feedback loop.

Figure 6:
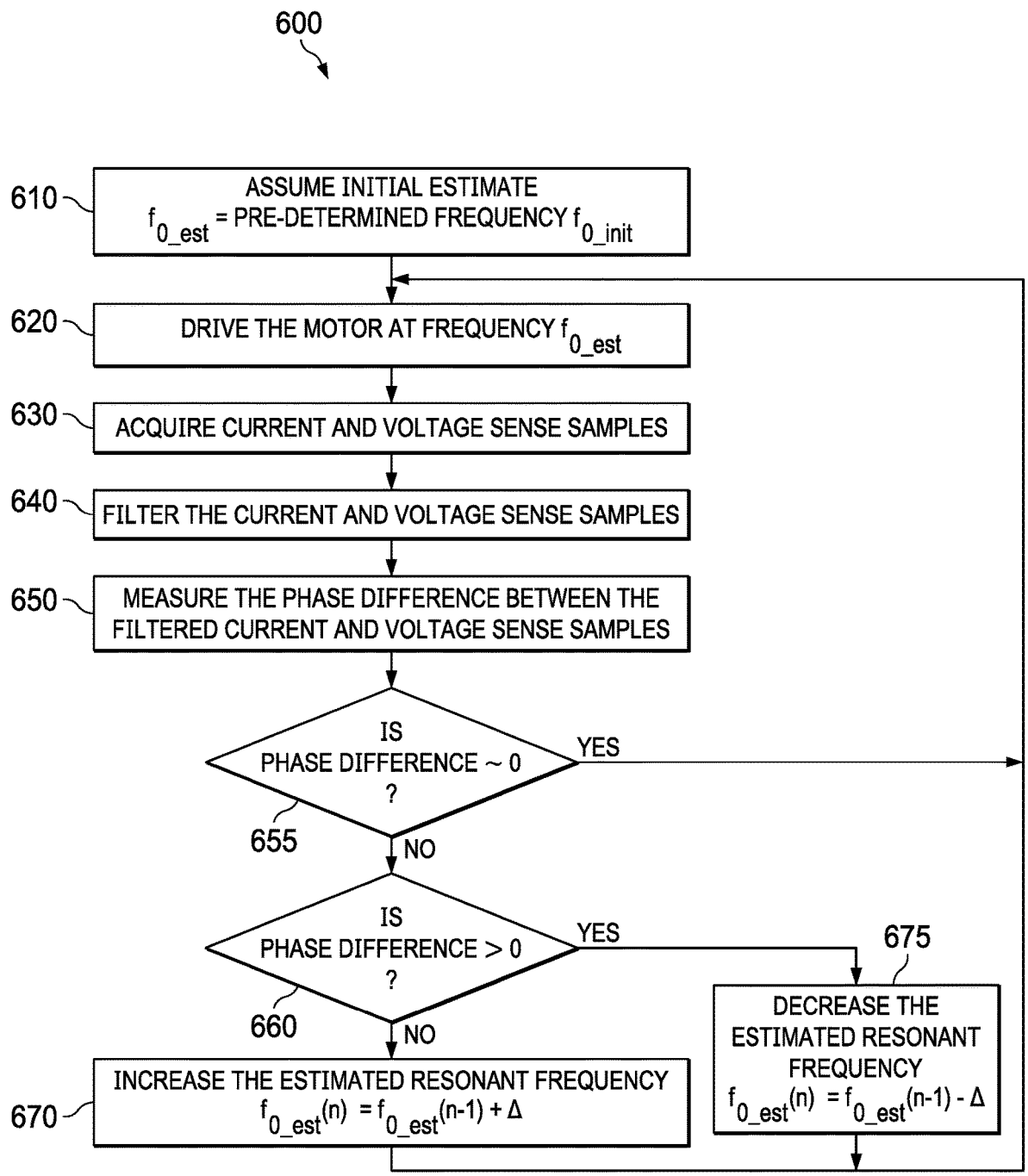
FIG. 6 shows a flow chart for an example method of closed loop phase tracking.

FIG. 6 shows a flow chart 600 of one example embodiment of the closed-loop system for driving an LRA at its resonant frequency. In step 610, a predetermined frequency $f_{0\_init}$ is used as the initial value for the estimated resonant frequency $f_{0\_est}$. In step 620, the motor drive circuit 310 is commanded to drive the motor at the frequency $f_{0\_est}$. In step 630, current and voltage are measured at the current and voltage sensing circuit 340 and 342.

In step 640, the current and voltage are filtered by noise filter 350 and 352. Phase compensation for the current may also occur in this step using phase compensation filter 360. In step 650, the phase is measured and the difference in phase between the current and voltage waveforms is determined using the phase measurement circuit 370.

In step 655, if the measurement in step 650 of the difference in phase between the current and voltage waveforms is within an acceptable threshold of zero, the resonant frequency will be deemed to have been found and the process is complete and no change needs to be made to $f_{0\_est}$. If the measurement in step 650 of the difference in phase between the current and voltage waveforms is not within an acceptable tolerance of zero, then in step 660 it is determined whether the phase difference is positive or negative. If the phase difference is negative, a new value for $f_{0\_est}$ is calculated in step 670 by increasing the previous $f_{0\_est}$ by a value $\Delta$. If the phase difference is positive, a new value for $f_{0\_est}$ is calculated in step 675 by decreasing the previous $f_{0\_est}$ by a value $\Delta$. The process then returns to step 620 to drive the motor at the new $f_{0\_est}$ frequency.

For the purposes of this disclosure, if an element is referred to as being "coupled" to another element, it may be directly coupled to the other element, or intervening elements may exist. If an element is referred to as being "directly coupled" to another element, no other intervening elements are intentionally disposed. The terms "substantially the same," "substantially equal," "substantially equal," "approximately equal," and "approximately the same" describe a quantitative relationship between two objects. This quantitative relationship may prefer the two objects to be equal by design but with the anticipation that a certain amount of variations can be introduced by the fabrication process.

While operations are depicted as occurring in a particular order, this should not be understood as requiring that all illustrated operations be performed or that the operations are required to be performed in that order to achieve desirable results unless such order is recited in one or more claims. In certain circumstances, multitasking and parallel processing may be advantageous. Moreover, the separation of various system components in the embodiments described above should not be understood as requiring such separation in all embodiments.

What is claimed is:

1. A method for closed loop phase tracking comprised of:
   determining a first estimated resonant frequency;
   generating a motor drive signal at the first estimated resonant frequency and applying the motor drive signal to a motor;
   measuring current and voltage of the motor drive signal;
   filtering the measurements of current and voltage;
   measuring the phase difference between the filtered current and voltage; and
   calculating a second estimated resonant frequency and adjusting the generated motor drive frequency to equal the second estimated resonant frequency.

2. The method of claim 1, wherein if an absolute value of the measured phase difference is less than a first threshold, the second estimated resonant frequency remains the same as the first estimated resonant frequency.

3. The method of claim 1, wherein if an absolute value of the measured phase difference is greater than a first threshold, the second estimated resonant frequency is equal to the first estimated resonant frequency increased or decreased by an incremental value.

4. The method of claim 1, wherein if an absolute value of the measured phase difference is greater than a first threshold, the second estimated resonant frequency is equal to the first estimated resonant frequency increased or decreased by a calculated amount that is a function of the measured phase difference and a mechanical quality factor that is a function of a mass of an object being moved and a spring constant of a spring attached to the object.

5. The method of claim 4, wherein the second estimated resonant frequency is higher than the first estimated resonant frequency if the measured phase difference is negative.

6. The method of claim 1, wherein the current and voltage measurements are filtered by a noise filter and a phase compensation filter.

7. The method of claim 6, wherein only the current measurements are filtered by the phase compensation filter.

8. The method of claim 6, wherein only the voltage measurements are filtered by the phase compensation filter.

9. The method of claim 6, wherein the noise filter is a bandpass filter.

10. The method of claim 6, wherein the noise filter is a low pass filter.

11. An apparatus for closed loop control of a linear resonant actuator comprising:
    a motor drive circuit that generates a motor drive signal having a frequency of a first resonant frequency and configured to provide the motor drive signal to a motor;
    a current and voltage sensing circuit configured to couple to a motor and measure current and voltage from the motor drive signal;
    a noise filter circuit coupled to the current and voltage sensing circuit that filters noise from the current and voltage measurements;
    a phase measurement circuit coupled to the noise filter circuit configured to receive the filtered current and voltage measurements as inputs and to output phase measurements of the current and voltage and a difference in phase between the current and voltage measurements; and
    a resonant frequency tracking circuit coupled to the phase measurement circuit configured to receive as inputs the phase measurements of the current and voltage and the difference in phase, calculate a second resonant frequency, and output to the motor drive circuit a frequency command corresponding to the second resonant frequency.

12. The apparatus of claim 11, further comprising a phase compensation filter with an input coupled to the noise filter circuit and an output coupled to the phase measurement circuit, configured to receive filtered current measurements, filter the filtered current measurements, and provide an output to the phase measurement circuit.

13. The apparatus of claim 11, wherein the noise filter circuit is a bandpass filter.

14. The apparatus of claim 11, wherein the noise filter circuit is a low pass filter.

15. The apparatus of claim 11, wherein the current and voltage sensing circuit only measures current, and a voltage from the motor drive circuit is input directly to the noise filter circuit.

16. The apparatus of claim 11, wherein the current and voltage sensing circuit only measures voltage, and a current from the motor drive circuit is input directly to the noise filter circuit.

17. A system for closed loop control of a linear resonant actuator comprising:
    a motor drive circuit configured to generate a motor drive signal having a frequency of a first resonant frequency;
    a current and voltage sensing circuit configured to measure current and voltage from the motor drive signal;
    a noise filter circuit configured to receive the current and voltage measurements and to filter noise from the current and voltage measurements;
    a phase measurement circuit configured to receive the filtered current and voltage measurements and to output phase measurements of the current and voltage and a difference in phase between the current and voltage measurements; and
    a resonant frequency tracking circuit configured to receive the phase measurements of the current and voltage and the difference in phase, calculate a second resonant frequency, and output to the motor drive circuit a frequency command corresponding to the second resonant frequency.

18. The system of claim 17, further comprising a phase compensation filter configured to receive filtered current measurements from an output of the noise filter circuit, filter the filtered current measurements, and provide an output to the phase measurement circuit.

19. The system of claim 17, wherein the noise filter circuit is a bandpass filter.

20. The system of claim 17, wherein the noise filter circuit is a low pass filter.

21. The system of claim 17, wherein the current and voltage sensing circuit only measures current, and a voltage from the motor drive circuit is input directly to the noise filter circuit.

22. The system of claim 17, wherein the current and voltage sensing circuit only measures voltage, and a current from the motor drive circuit is input directly to the noise filter circuit.

* * * * *